Patented Oct. 31, 1950

2,528,351

UNITED STATES PATENT OFFICE 2,528,351

ALKALINE SULFITE DIGESTION OF HARDWOOD

Eduard Farber, Washington, D. C., assignor, by mesne assignments, to Hardwood By-Products, Inc., Asheville, N. C., a corporation of Delaware No Drawing. Application August 17, 1950, Serial No. 180,093

2 Claims. (Cl. 92—13)

The present process is primarily concerned with the production of so-called hardwood pulps. The term hardwood is generally used to comprise those kinds of woods which have deciduous leaves. In connection with the present method, the chemically important fact is that hardwoods are characterized by a high content of hemicelluloses. The invention is concerned only with the kinds of wood which are rich in such hemicelluloses, i. e., wood characterized by a hemicellulose content of at least 18%. Among species of this kind are all the common hardwoods, for example, poplar, oak, maple, gums, walnut, etc. Wood species in which the hemicellulose content is at least 18% are less stable against chemical actions than the woods with lower hemicellulose content, especially the so-called soft woods, in which the hemicelluloses range between 6% and 10%. Mesquite is about at the border line of those woods which can be treated according to the present invention. According to its hemicellulose content, mesquite is below the average of normal hardwoods. In correlation with this fact it has been found that this wood cannot be treated as successfully as woods with higher hemicellulose contents.

Some attempts have been made in the past to produce wood pulp from so-called hardwoods. However, the approach has usually been through processes analogous to the methods developed for producing pulp from soft woods by chemical treatment with high temperatures and high pressures, with the aim of manufacturing material of high cellulose content and purity. It is the object of the present invention to utilize the particular chemical properties of the hardwood substance to respond to mild chemical action and to yield fibers, which, although they still contain much lignin, readily form sheets or boards of good technical properties.

Inherently in the production of hardwood products considerable waste occurs in the form of shavings, veneer chips, wood chips, slabs, edgings, and the like. Hardwood is recognized as a valuable structural material. In its broader aspects, the present invention contemplates the recovery and transformation of the hardwood waste products into a form permitting of their employment as structural material with as little modification of the inherently possessed properties of hardwood as can be brought about. The hardwood pulp of the present invention comprises in large measure the hardwood starting material modified primarily as to form with a separation through mild chemical extraction of only a sufficient amount of bonding agents of the natural wood to permit of the change in form of the wood waste and the production of sheets and boards of hardwood pulp. That is, the primary object of the present invention is not to produce pure or nearly pure cellulose or materials having a high alpha cellulose content, but on the contrary merely to convert the wood substance into a material which lends itself to be fiberized readily. Generally speaking, it is the purpose of the process of this invention to remove from the wood bonding agents in an amount not greater than about 25% of the original weight of the wood. Preferably, bonding agents in an amount equal to from about 10% to about 20% of the weight of the wood are so removed.

Coming to the details of the process of the present invention, the hardwood waste materials are often found in a form ready for treatment. In other instances, the hardwood waste materials will be reduced to small particle size, but at least large enough to contain original fiber length and thickness of the wood fiber.

In this form, the wood particles are preferably subjected to an initial washing and extraction with water at ordinary or slightly elevated temperature to remove water soluble materials and to prewet the wood charge for better reception of the subsequent chemical solution.

The water containing such extractives may then be separated from the wood and substituted by a dilute solution of sodium bisulfite. For 100 parts of wood waste, between 2 and 10 parts of sodium bisulfite may be used dissolved in 400 to 500 parts of water. This dilute sodium bisulfite treatment may be carried out at room temperature or, generally speaking, at temperatures within the range of 15° C. to 30° C. for periods of one to two hours. Additional organic material is thereby dissolved out of the wood with only small consumption of the free sulfite. The dark sulfite solution is then removed and in case a relatively large amount of sulfite has been used, the solution can be reused for treating further amounts of wood.

After the wood has been extracted with water and with the sodium bisulfite solution, it is then subjected to a mild alkaline digestion in which, for instance, solutions containing 1% to 4% of free sodium hydroxide are mixed with the pre-treated wood substance preferably at elevated temperatures usually in the neighborhood of 70° C. to 80° C., but well below 100° C. The amount of free sodium hydroxide consumed in this digestion is usually of the order of 3 to 5 parts per 100 parts of wood substance. For 100 parts of wood between 300 and 500 parts of alkali solution may be used.

It has been found that the extractives separated by the bisulfite solution contain materials that are precipitated by free alkali; therefore, it is desirable to separate the bisulfite treatment from the alkaline digestion wherever the whiteness of the end product is of importance. In certain cases, where whiteness of the end product is not essential, the two treatments may be combined. Wood is then digested with a solution of sodium hydroxide containing sodium bisulfite in approximately the proportions mentioned. In this alkaline solution, the sulfite is susceptible to secondary oxidation in contact with air.

When the process of this invention is carried out in the above described manner wherein the alkali metal hydroxide and alkali metal sulfite are both present in the same solution, the invention is effected at a temperature substantially below 100° C., but not less than about 55° C. Preferably the invention is carried out at a temperature of from about 55° C. to 75° C. In some instances it may be advantageous to utilize a range of 60° C. to 75° C. Likewise, it has been found that the previously specified amount of bonding agents may be removed by such digestion for a period of from approximately one to approximately two hours.

Where the cost of chemicals is a decisive factor or an especially white pulp is required it is preferable to use the treatment in separate steps; whereas, when the cost of handling is a primary consideration and a dark pulp may be tolerated, it may be more advantageous to apply the treatment in a single stage with a combined chemical solution.

The following examples are illustrative of the invention:

*Example I.*—In this case, 4 kilograms on a dry weight basis of oak wood chips containing some bark were subjected to treatment. The treating solution was composed of 22.5 kilograms of water, 1350 grams of sodium hydroxide and 450 grams of $Na_2S_2O_5$. The solution was initially raised to 80° C., and the reaction conducted for a period of 2 hours at temperatures approximating 57° C. to 60° C. The wet chips were separated from the solution by filtration and thereafter pressed. 9.18 kilograms of wet wood material were removed from the solution. In this experiment, approximately 115 grams of sodium hydroxide were reacted for each kilogram of wood treated, considered on a dry weight basis. The 9.18 kilograms of wet wood material were placed in a beater with 46 kilograms of water and subjected to a beating action for 25 minutes. The material was then water washed and acidified with 25 cc. of concentrated sulfuric acid diluted in one liter of water, thereafter washed once and pressed. The wet pulp represented 11.1 kilograms, which constitutes 3.11 kilograms computed on a dry basis, representing about 76% of the wood treated. The bark particles showed up as dark specks in the pulp.

*Example II.*—In this example 4.5 kilograms of hammer milled oak chips on a dry weight basis were treated. The treating solution was comprised of 22.5 kilograms of water containing 540 grams of sodium hydroxide and 180 grams of $Na_2S_2O_5$. The reaction time employed was one hour and the temperature approximately 55° C. Final determinations indicate that about 62.7 grams of sodium hydroxide were reacted for each kilogram of wood chips employed. The wet wood material separated from the treating solution by filtration was pressed and mixed with water to the proper consistency for beating and subjected to a beating operation for 25 minutes. The wet pulp was drained and washed three times with water. It was then acidified with 20 cc. of concentrated sulfuric acid diluted with water. The pulp recovered represented 3.4 kilograms on a dry weight basis or approximately 75.5% of the wood treated. Some loss of fines occurred in this example through a screening operation. Then a comparative freeness test was run on the pulp product of this example. 10 grams on a dry weight basis was prepared in a 500 cc. slurry and filtered into graduate drainage. 99 cc. passed the filter in 5 minutes and 131 cc. had passed the filter in 10 minutes, the filtering being very slow during the latter 5 minutes.

*Example III.*—In this example, 12 kilograms on a dry weight basis of hammer milled oak chips were treated. The treating solution was comprised of 60 kilograms of water containing 720 grams of sodium hydroxide and 120 grams of $Na_2S_2O_5$. The reaction time was one hour and the temperature of reaction approximately 60° C. The wet wood separated from the reaction represented 28.9 kilograms. A final determination indicated that 46.5 grams of sodium hydroxide were reacted for each kilogram of wood treated. The wet wood material was mixed with water and subjected to a beating operation. The beater time employed was 1¼ hours. The pulp produced represented 10.5 kilograms on the dry basis or approximately 87.5% of the wood treated. In the comparative test, 152 cc. of filtrate passed the filter in 5 minutes.

*Example IV.*—In this example, 20 kilograms on a dry weight basis of oak chips were subjected to treatment. The treating solution was comprised of 120 kilograms of water containing 1200 grams of sodium hydroxide and 200 grams of $Na_2S_2O_5$. The reaction time was 2 hours and the temperature was maintained between 70° C. and 75° C. 49.3 kilograms of wet fibers were separated from the treating solution by filtration. The wet fibers were mixed with water and subjected to a beater treatment for one hour. The pulp was water washed, acidified and formed into sheets. The pulp represented 16.9 kilograms on a dry basis or a yield of approximately 84.5%. The comparative test showed a drainage of 148 cc. in 5 minutes.

*Example V.*—In this example, 8 kilograms on a dry weight basis of hardwood chips composed of oak, maple and walnut were treated. The treating solution comprised 48 kilograms of water containing 1200 grams of sodium hydroxide and 120 grams of $Na_2S_2O_5$. The reaction time was 1½ hours and the temperature was maintained between 61° C. and 72° C. 21 kilograms of wet material was separated from the solution at the end of the reaction time. Water was added to this material and it was subjected to beater treatment for 45 minutes. Final determinations indicate that 78 grams of sodium hydroxide were reacted for each kilogram of wood treated. 7.2 kilograms of a good grade of pulp was recovered, representing 90% on the basis of the wood treated. The comparative test disclosed a drainage of 139 cc. of filtrate in 5 minutes.

*Example VI.*—In this example, 8 kilograms on a dry weight basis of hardwood chips containing red gum, poplar and beech were treated. The treating solution comprised 50 kilograms of water containing 1600 grams of sodium hydroxide, and 120 grams of $Na_2S_2O_5$. The reaction time was 1½ hours and the temperature was maintained between 59° C. and 70° C. 21 kilograms of wet wood material were separated from the solution at the end of the reaction period. This material was diluted with water and subjected to a beater treatment for approximately one hour. A final check indicated that 97 grams of sodium hydroxide were reacted for each kilogram of wood material treated.

6.62 kilograms of a good grade of pulp was produced representing approximately 82% on the basis of the dry wood treated. The pulp on a comparative test showed a drainage of 251 cc. of filtrate in 5 minutes.

*Example VII.*—It is the purpose of this example to demonstrate the criticality of the use of a combination of both an alkali metal sulfite and an alkali metal hydroxide in the process of this invention. To this end, three identical experiments were carried out with the exception that in the first of the experiments a combination of sodium sulfite and sodium hydroxide was employed, whereas in the second experiment the sodium sulfite was omitted and in the third experiment sodium hydroxide was omitted.

Each of the experiments was carried out as follows:

Approximately 3 kilograms of chips consisting predominantly of poplar, walnut and oak were treated for a period of about two hours at a temperature of about 70° C. with 24 kilograms of a solution containing the chemicals aforementioned. In the first experiment the solution contained about 1.5% by weight of sodium hydroxide and about 0.62% of $Na_2S_2O_5$. In the second experiment, the $Na_2S_2O_5$ was omitted from the solution and in the third experiment the sodium hydroxide was omitted. The product resulting from each of the three described treatments was diluted with water and subjected to a treatment in a beater for approximately one hour. A comparative test was then run on each of the products which indicated that the materials resulting from experiments 2 and 3 were unsatisfactory pulps. The comparative test was carried out as follows:

The beaten pulp was permitted to drain and an amount thereof equal to 5 grams of the pulp on a dry weight basis was dispersed in approximately 500 cc. of water and the three dispersions placed in three cylindrical containers. Notation was then made of the volume of clear supernatant liquid separating above the settled pulp after periods of 5, 15 and 30 minutes at room temperature. Measured by these comparative tests, pulps in which an amount of supernatant liquid greater than about 250 cc. separates in five minutes is considered unsatisfactory. Similarly, pulps from which an amount of supernatant liquid greater than about 275 cc. separate in fifteen minutes are unsatisfactory as are pulps from which more than about 285 cc. of supernatant liquid separate in about thirty minutes. The results of the three experiments carried out in accordance with this example are set forth in the following table:

*Table I*

| Time | cc. Supernatant Liquid | | | |
| --- | --- | --- | --- | --- |
| | max. limit | hydroxide and sulfite | sulfite alone | hydroxide alone |
| 5 min | 250 | 230 | 345 | 295 |
| 15 min | 275 | 255 | 360 | 315 |
| 30 min | 285 | 263 | 365 | 317 |

It will be observed that in the comparative tests run in which either the sodium hydroxide or the $Na_2S_2O_5$ was omitted that the amount of supernatant liquid separated after 5 minutes time was far in excess of a permissible limit of about 250 cc. and the pulp so produced was in effect a mere ground up wood which demonstrated no appreciable change from the chemical treatment to which it had been subjected. Analogous results were obtained after 15 minutes and 30 minutes. It is apparent that neither $Na_2S_2O_5$ nor sodium hydroxide alone is sufficient to prepare hardwood fibers for subsequent fiberizing treatment in accordance with this invention and further that the combination of both the sodium sulfite and sodium hydroxide is essential to the successful practice of the invention. It is further apparent that the use of an alkali metal sulfite is critical and that the substitution therefor of sodium carbonate or a similar material which is merely weakly basic in character is not operable in the process disclosed herein. Ostensibly, the unique properties of sodium sulfite are attributable to a combination thereof with aldehydes contained in the wood substance treated.

In all these procedures, chemicals are used in dilute solutions without superatmospheric pressures and the consumption of chemicals is relatively low, for instance, between 0.5 to 1 pound of sulfite and between 3 and 6 pounds of sodium hydroxide per 100 pounds of wood subjected to the treatment.

The method has been applied successfully to many different kinds of hardwoods, especially to waste materials occurring in lumber or veneer cutting operations. Large pieces of waste wood in the form of edging or hogged fuel are best broken down to appropriate size in a hammer mill. Wastes from the production of veneer usually are in the form of thin slabs which up to now have been useless even as a fuel because of their large surface development and light weight. Such veneer chips can readily be converted into valuable pulp according to the present method.

An additional advantage of carrying out the process in several steps according to the present preferred method resides in a considerable reduction of foaming during agitating or beating. Digested wood chips resulting from the one-step process have a tendency to foam during the beating period. Material prepared by first treating with the bisulfite solution and then digesting with alkali has been found to form very little foam in the beater even when beating was carried out at alkaline reaction.

This application is a continuation-in-part of application Serial No. 752,829, filed June 5, 1947.

What I claim is:

1. A process of preparing for subsequent fiberizing treatment particles of hardwoods having a hemicellulose content of at least 18% which comprises essentially digesting said particles at atmospheric pressure for a period of from about one to about two hours at a temperature of from about 55° C. to about 75° C. with a dilute aqueous solution containing essentially from about 1% to about 4% by weight of an alkali metal hydroxide and from about 0.4% to about 2.5% of an alkali metal sulfite.

2. The process of claim 1 in which the alkali metal hydroxide is sodium hydroxide and the alkali metal sulfite is sodium sulfite.

EDUARD FARBER.

REFERENCES CITED

The following references are of record in the file of this patent:

UNITED STATES PATENTS

| Number | Name | Date |
| --- | --- | --- |
| Re. 20,217 | Dunbar | Dec. 29, 1936 |
| 66,338 | Heaton | July 2, 1867 |
| 223,670 | Farrell | Jan. 20, 1880 |
| 227,464 | Wilson et al. | May 11, 1880 |
| 1,389,936 | Clapp | Sept. 6, 1921 |
| 1,501,925 | Shaw | July 22, 1924 |
| 1,631,834 | Schorger | June 7, 1927 |
| 1,654,624 | Wells | Jan. 3, 1928 |
| 1,682,834 | Dedrich | Sept. 4, 1928 |
| 1,846,511 | Darling | Feb. 23, 1932 |
| 1,848,661 | Richter | Mar. 8, 1932 |
| 1,859,848 | Rue | May 24, 1932 |
| 1,873,056 | Smith | Aug 23, 1932 |
| 1,920,496 | Carpenter | Aug. 1, 1933 |
| 1,931,575 | de la Roza | Oct. 24, 1933 |
| 1,936,697 | Traquair | Nov. 28, 1933 |
| 2,038,925 | Dunbar | Apr. 28, 1936 |
| 2,041,745 | Dreyfus | May 26, 1936 |
| 2,065,396 | Richter | Dec. 22, 1936 |
| 2,110,546 | Dreyfus | Mar. 8, 1938 |
| 2,118,074 | Dreyfus | May 24, 1938 |
| 2,188,533 | Drewsen | Jan. 30, 1940 |
| 2,190,194 | Richter | Feb. 13, 1940 |
| 2,247,204 | Schorger | June 24, 1941 |
| 2,292,390 | Meiler | Aug. 11, 1942 |

FOREIGN PATENTS

| Number | Country | Date |
| --- | --- | --- |
| 322,763 | Great Britain | Dec. 2, 1929 |
| 54,042 | Norway | June 11, 1934 |

OTHER REFERENCES

Paper Trade Journal, Mar. 5, 1927, pages 55 and 56.

Paper Trade Journal, May 23, 1946, pages 43 and 44.

Industrial and Engineering Chemistry, Jan. 1941, page 82.

Chemical Abstracts, vol. 36, page 2,140 (1942).

Report on Third International Conference on Timber Utilization, Paris, July 26–28, 1937, No. 16/17 Special No., pages 90 and 93–97.

Chemistry of Pulp and Paper Making by Sutermeister, 3d edition, pages 255–260 (1941), published by John Wiley and Sons, New York.